(12) United States Patent
Neubert et al.

(10) Patent No.: US 7,832,235 B2
(45) Date of Patent: Nov. 16, 2010

(54) APPARATUS AND METHOD FOR WINDING AT LEAST ONE FIBER

(75) Inventors: Mike Neubert, Dautphetal (DE); Johannes Weg, Dillenburg (DE)

(73) Assignee: Eha Spezialmaschinenbau GmbH, Steffenberg (DE)

( * ) Notice: Subject to any disclaimer, the term of this patent is extended or adjusted under 35 U.S.C. 154(b) by 1089 days.

(21) Appl. No.: 11/065,135

(22) Filed: Feb. 24, 2005

(65) Prior Publication Data
US 2005/0193775 A1    Sep. 8, 2005

(30) Foreign Application Priority Data
Mar. 6, 2004   (EP)   ................... 04005399

(51) Int. Cl.
*C03B 37/12*   (2006.01)
(52) U.S. Cl. .............. 65/479; 65/529; 65/535; 65/539; 65/432
(58) Field of Classification Search ............ 65/452, 65/453, 479, 480, 486, 487, 535, 539
See application file for complete search history.

(56) References Cited

U.S. PATENT DOCUMENTS

| 3,855,771 | A | * | 12/1974 | Yoshizawa et al. | ............ 57/269 |
| 4,790,898 | A | * | 12/1988 | Woods | ............ 156/166 |
| 2004/0025541 | A1 | * | 2/2004 | Yamada et al. | ............ 65/382 |
| 2005/0126227 | A1 | * | 6/2005 | Collaro | ............ 65/378 |

* cited by examiner

Primary Examiner—Queenie Dehghan
(74) Attorney, Agent, or Firm—Andrew Wilford

(57) ABSTRACT

An apparatus for winding a fiber strand onto a former, wherein there is provided a separating means for fixing and separating the fiber strand at the end of an operation of winding on a finish-wound first former and for bringing the fixed fiber-strand end to a second former to be wound in order to begin a new winding operation. At least one thread buffer for temporary storage of a fiber-strand portion between the end of one winding operation and the beginning of a new winding operation is disposed upstream from the separating means in the feed direction.

2 Claims, 7 Drawing Sheets

APPARATUS AND METHOD FOR WINDING AT LEAST ONE FIBER

FIELD OF THE INVENTION

The invention relates to an apparatus for winding at least one fiber, especially a fiber strand, onto a former. The invention also relates to a method for winding at least one fiber, especially a fiber strand, onto a former.

DESCRIPTION OF THE PRIOR ART

From practical experience it is known how to impregnate a fiber strand with a resin and then to wind the impregnated fiber strand onto a former. The former is in particular a cylindrical hollow body, such as a blow-molded plastic container. The resin used for impregnation is allowed to cure, and the resulting end product can be used, for example, as a tank for liquids or similar substances. When the operation of winding on one former is to be ended in these known apparatuses or methods, the fiber strand is manually cut off and then manually attached to another former. It is self-evident that this procedure takes time and effort, and also that the winding operation must be interrupted repeatedly, meaning that a continuous procedure is not possible.

However, a more or less automated method is also known from practical experience. After the end of the operation of winding on one former, the fiber strand is then wound onto a core, where it is cut off. After removal of the finish-wound former, a further former is inserted. Thereupon the fiber strand is wound from the core onto this further former. However, this procedure leaves much to be desired as regards functional reliability and precision. Furthermore, the starting turns in this procedure can be applied only at the axial end of the former, and to this extent limits are imposed on a flexible working technique.

OBJECTS OF THE INVENTION

In contrast, the object of the invention is to provide an apparatus of the type mentioned hereinabove, with which an automatic and continuous working technique is possible with little time and effort and high functional reliability.

A further technical object of the invention is to provide a corresponding method.

SUMMARY OF THE INVENTION

To attain these objects, the invention teaches an apparatus for winding at least one fiber, especially a fiber strand, onto a former, having separating means, with which the fiber strand can be separated and fixed to the separating means at the end of an operation of winding on a finish-wound first former, and wherein the separating means is provided for bringing the fiber-strand end fixed on the separating means to a second former to be wound in order to begin a new winding operation, and wherein at least one thread buffer for temporary storage of a fiber-strand portion between the end of one winding operation and the beginning of a new winding operation is disposed upstream from the separating means in feed direction.

BRIEF DESCRIPTION OF THE DRAWINGS

The invention will be explained in more detail hereinafter on the basis of a drawing, which illustrates merely one practical example and in which, in schematic diagrams.

DETAILED DESCRIPTION OF THE PREFERRED EMBODIMENTS

Figure 1:
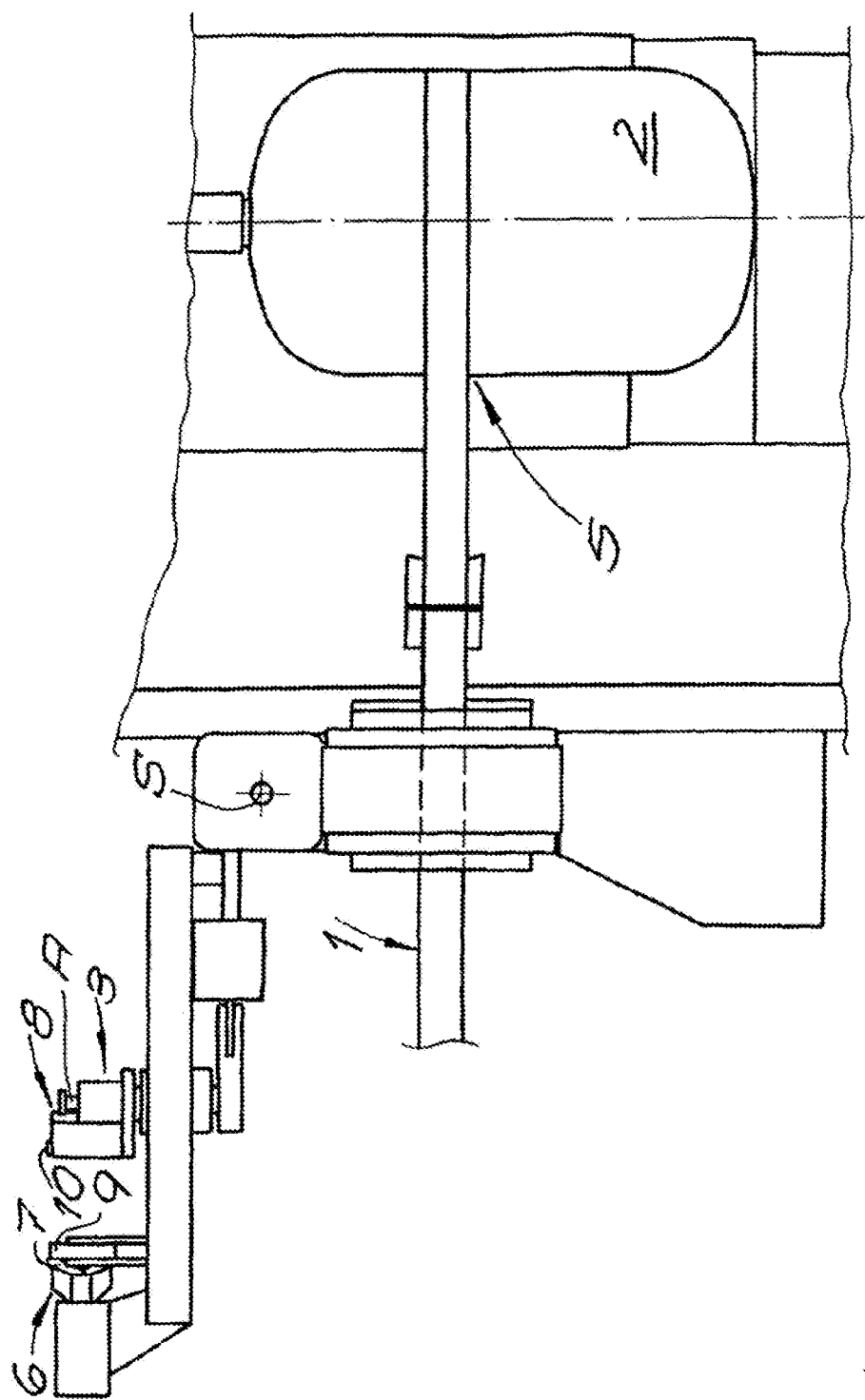
FIG. 1 shows a top view of an inventive apparatus.
Figure 2:
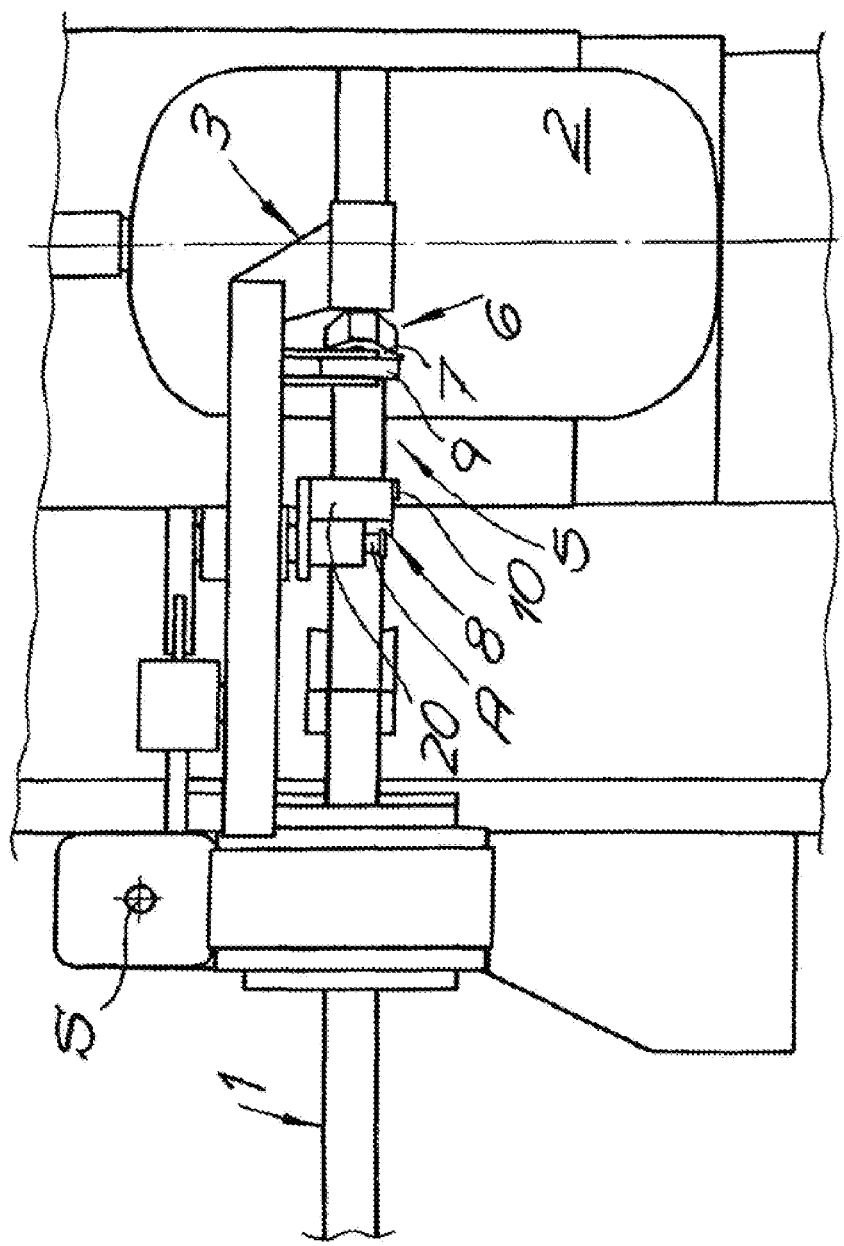
FIG. 2 shows the object according to FIG. 1 in another functional position.

It is within the scope of the invention for a fiber strand comprising a plurality of fibers or filaments to be wound onto a former. Within the fiber strand, the fibers or filaments are disposed in the form of bundles or flat tapes. The fibers can be glass fibers, carbon fibers, aramide fibers or even 1plastic fibers, such as polyester fibers. The fiber strand is expediently taken off a spool and then passed through the impregnater.

On the one hand, the former can be what is known as a liner, or in other words a former that remains in the product and becomes a part of the product. On the other hand, however, the former can also be a mandrel that is withdrawn from the product after a winding operation or after the resin has cured, and that is reusable for further winding operations. It is within the scope of the invention for a former to be rotated during a winding operation.

According to a first embodiment, at least one impregnater for impregnating the fiber strand with a resin is present. Expediently, the impregnater is disposed upstream from the thread buffer in the feed direction. Here and also hereinafter, feed direction means the direction in which the fiber strand is transported. Impregnation or saturation of the fiber strand with a resin matrix takes place in the impregnater. The resin or synthetic resin can be a thermosetting resin or a thermoplastic plastic.

According to a second embodiment, a preimpregnated fiber or a preimpregnated fiber strand is fed to the thread buffer and to the former. Such preimpregnated fibers are also known as prepregs. Thus an impregnater is not necessary in this second embodiment of the inventive apparatus.

It is also within the scope of the invention for the separating means to be provided with a clamp for fixing or for clamping the fiber strand and also with a cutter for severing the fiber strand. The clamp is expediently equipped with two oppositely acting clamping jaws, between which the fiber strand can be clamped. The cutter is preferably provided with at least one cutting blade. The cutter or the cutting blade is preferably disposed downstream from the clamp in the feed direction. According to a preferred embodiment, the separating means comprising a clamp and a cutter is disposed in the winding region or in the region of the former only during the end of one winding operation and at the beginning of a new winding operation, and otherwise can be pivoted out of the winding region.

When the fiber strand is severed by means of the cutter at the end of a winding operation, one trailing end remains of the fiber strand already wound onto the former. According to a particularly preferred embodiment of the invention, there is provided a squeegee with which this trailing end of the fiber strand is squeezed or pressed against the finish-wound former. The trailing end is expediently squeezed against the former immediately after cutting/separation. The squeegee is preferably configured in the form of an elastic lip. During further rotation of the finish-wound former, this elastic lip automatically presses the trailing end of the fiber strand against this former. During the squeezing action, therefore, this elastic lip is disposed closely or directly above the finish-wound former.

Thereafter the finish-wound first former is removed and a second former to be newly wound is introduced into the winding region. It is within the scope of the invention for the fixed fiber-strand end to be brought together with the separating means or together with the clamp to the second former to be newly wound, so that the fiber-strand end fixed in the clamp is in contact with the second former to be newly wound. Thereafter the separating means or clamp opens and the fiber-strand end is released and rests on the second former. In other words, therefore, the clamping jaws of the clamp open, so that the fiber-strand end is now in contact only with the second former to be newly wound.

According to a very preferred embodiment of the invention, there is provided, on the separating means, a second squeegee, with which the fiber-strand end can be pressed against the second former to be newly wound after detachment from the separating means or clamp. Thus the fiber-strand end is squeezed or pressed against the second former, preferably after the clamping jaws of the clamp have opened and it is resting on this second former. The second squeegee also is designed expediently as an elastic lip, which presses the fiber-strand end against the second former. It is within the scope of the invention for this elastic lip to be disposed directly above the second former when the separating means is located in the winding region or in the region of the former.

According to a particularly preferred embodiment of the invention, the thread buffer is provided with at least two guide rolls for the fiber strand and, by increasing the distance between these two guide rolls, a fiber-strand portion proportional to the distance increment Δa can be stored temporarily between these two guide rolls. Preferably one guide roll is displaced toward the second guide roll or is moved away from the second guide roll. In the process, the first guide roll carries along with it, so to speak, the fiber strand wrapped around it, so that the fiber-strand portion is temporarily stored between the first and second guide rolls.

To solve the technical problem explained in the foregoing, the invention further teaches a method for winding at least one fiber, especially a fiber strand, onto a former, wherein the continuously fed fiber strand is impregnated with a resin and wherein the impregnated fiber strand is wound onto a first former driven in rotation, wherein the fiber strand is fixed and severed in the course of ending the operation of winding on the first former, wherein a fiber-strand portion of the fiber strand, which is still being continuously fed, is temporarily stored in a thread buffer as long as the fiber strand is fixed, wherein the fixed fiber-strand end is detached to apply the starting turns on the second former to be newly wound by shifting the clamp jaws toward the axis, wherein the starting turns of the temporarily stored fiber-strand portion are then applied to the second former under a first smaller thread tension, and wherein the continuously fed fiber strand is then wound on the second former under a second higher thread tension, and so on.

According to one embodiment of the invention, the fact that the fiber strand is impregnated with a resin means that the fiber strand is impregnated on-line, or in other words in an impregnater disposed upstream from the thread buffer or from the former. Within the scope of the inventive method, however, the fiber strand can also be impregnated off-line, or in other words be a preimpregnated fiber strand. Within the scope of the invention, fixing means is provided for clamping of the fiber strand or of the fiber-strand end between the clamping jaws of a clamp. Thus this fixed fiber-strand end is no longer moved further or is no longer further delivered. By virtue of the inventive temporary storage of a thread-strand portion, however, the fiber strand can nevertheless be continuously fed further to the thread buffer. After detachment or release of the fiber-strand end, the starting turns of the fiber strand are then first applied to the second former to be newly wound. For this purpose, this second former together with the detached fiber-strand end resting on it is turned in the direction opposite to winding direction, or in other words in the direction of unwinding of the former. In the process, the fiber-strand end is then preferably pressed against the second former by the second squeegee of the separating means. During rotation in unwinding direction, the former preferably executes only one partial revolution, for example one quarter revolution. Then the former reverses its direction of rotation and is turned in the winding direction. Thereupon the starting turns of the fiber strand are applied on the second former with the first lower thread tension. The thread buffer permits the storage of a sufficiently long fiber-strand portion that the starting turns can be applied with low or weak thread tension. While the starting turns are being applied with the first lower thread tension, the former expediently executes one half revolution to as many as four revolutions, preferably one half revolution to as many as two revolutions. Thread tension means the tension or initial tension with which the fiber strand runs onto the former. After the starting turns have been applied, winding onto the former then takes place under the second higher thread tension. This second higher thread tension is usually associated with a higher speed of rotation of the former than is the case while the starting turns are being applied.

The invention is based on the knowledge that, by virtue of the inventive configuration of the apparatus or by virtue of the inventive procedure, very simple and functionally reliable winding of a fiber strand onto formers is possible, and that, in the process, continuous operation in particular is possible. In principle, therefore, stoppages of the winding operation are not necessary. It is also of particular importance that winding can be accomplished very precisely with the inventive apparatus and with the inventive method. The winding speed of the inventive method is substantially higher than the winding speed in comparable winding methods known from the prior art. It must also be emphasized that these advantages are achieved with relatively little time and effort.

SPECIFIC DESCRIPTION

The figures show an apparatus for winding a fiber strand 1 onto a former 2. Fiber strand 1 is preferably—and this is the case in the practical example—a flat tape composed of a plurality of fibers. Fiber strand 1 is first passed through an impregnater, not illustrated in the figures, in which it is impregnated or saturated with a synthetic resin. The fiber strand saturated with the synthetic resin is then wound onto former 2. In the practical example, former 2 is a winding mandrel that is driven in rotation and that is removed from the product and reused for a subsequent winding operation after a winding operation has ended and the synthetic resin has cured.

The figures show a separating means 3 for fixing and separating fiber strand 1 at the end of an operation of winding on a finish-wound first former 2 and for bringing fixed fiber-strand end 4 to a second former 2' to be newly wound in order to begin a new winding operation.

FIG. 1 shows the functional condition in which the winding operation is in full swing. In this functional condition, separating means 3 is pivoted out of the winding region 5 on former 2. For this purpose, separating means 3 can be pivoted around swivel shaft S. At the end of a winding operation, separating means 3 is pivoted into winding region 5. This functional condition is illustrated in FIGS. 2 to 5 and 7.

Figure 3:
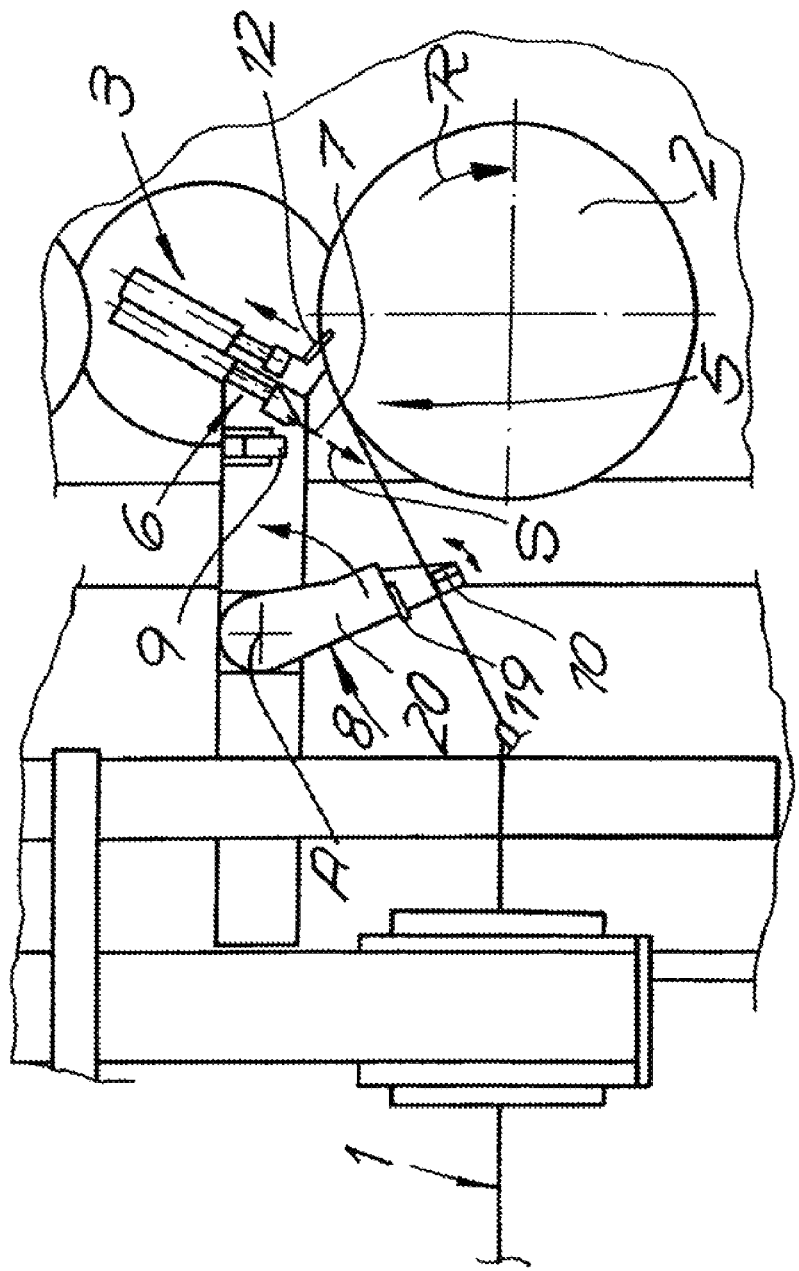
FIG. 3 shows a side view of the object according to FIG. 2.
Figure 4:
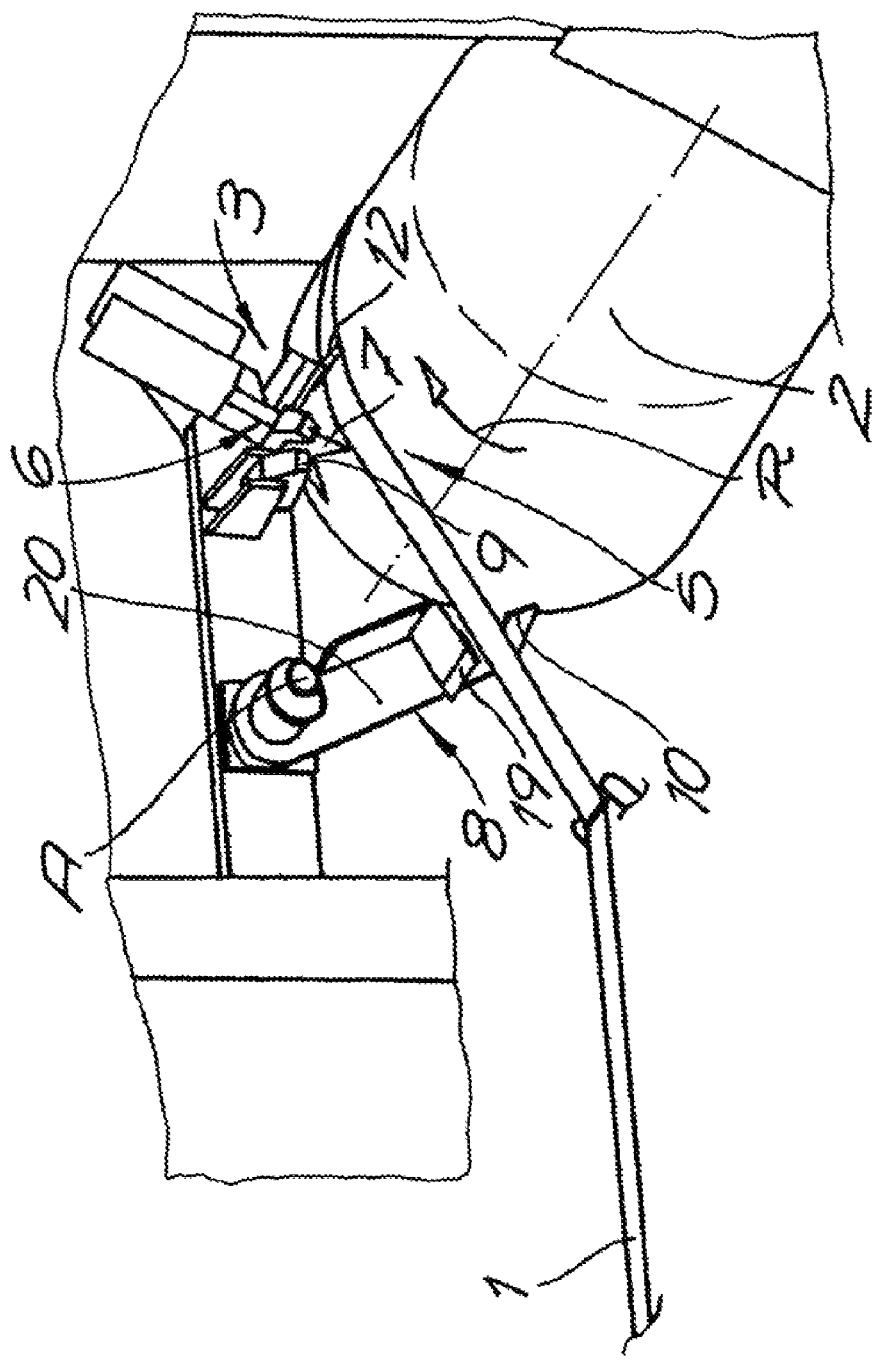
FIG. 4 shows a perspective view of the object according to FIG. 3.
Figure 5:
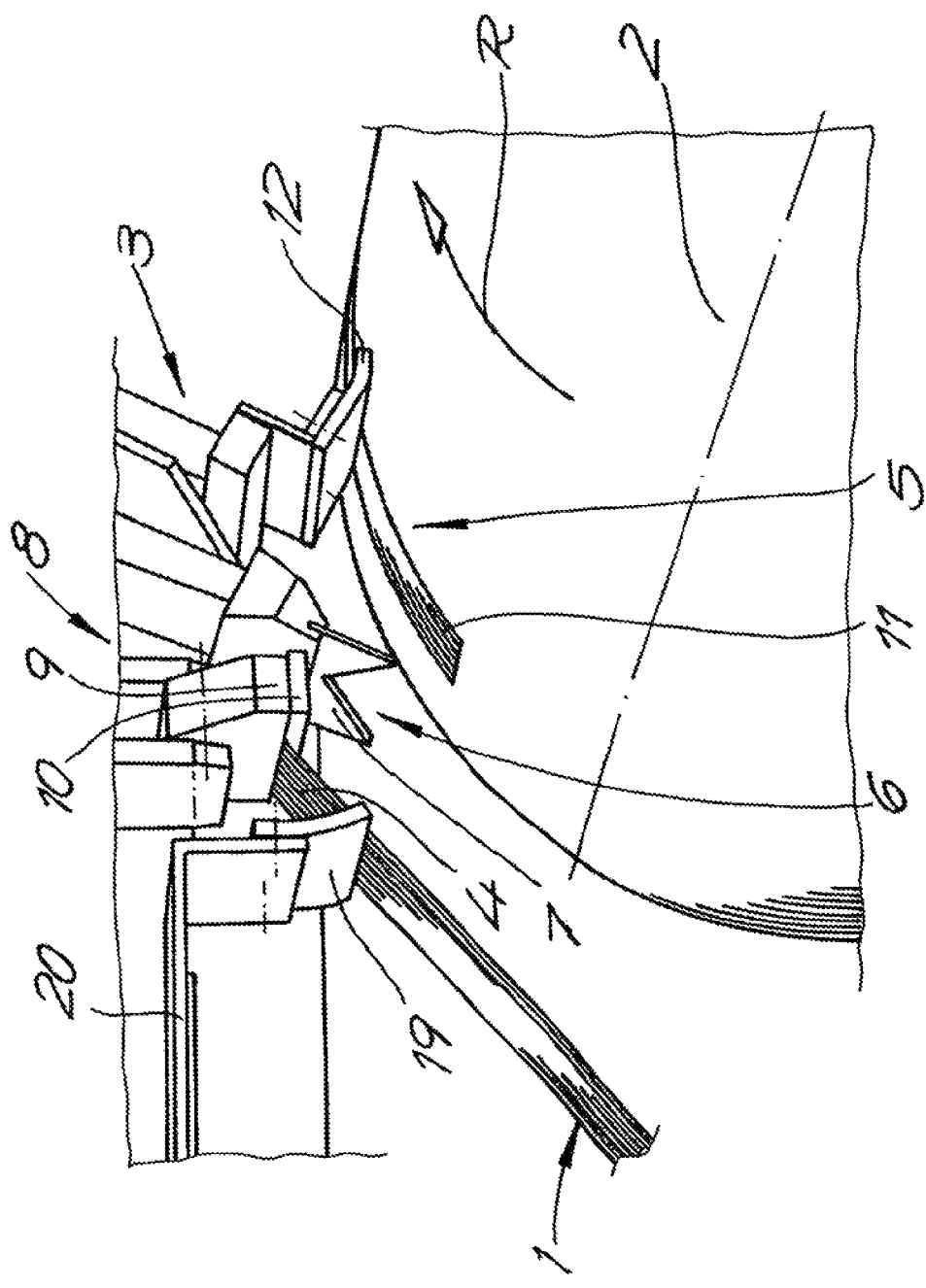
FIG. 5 shows a detail of the object according to FIG. 4 in another functional position.
Figure 7:
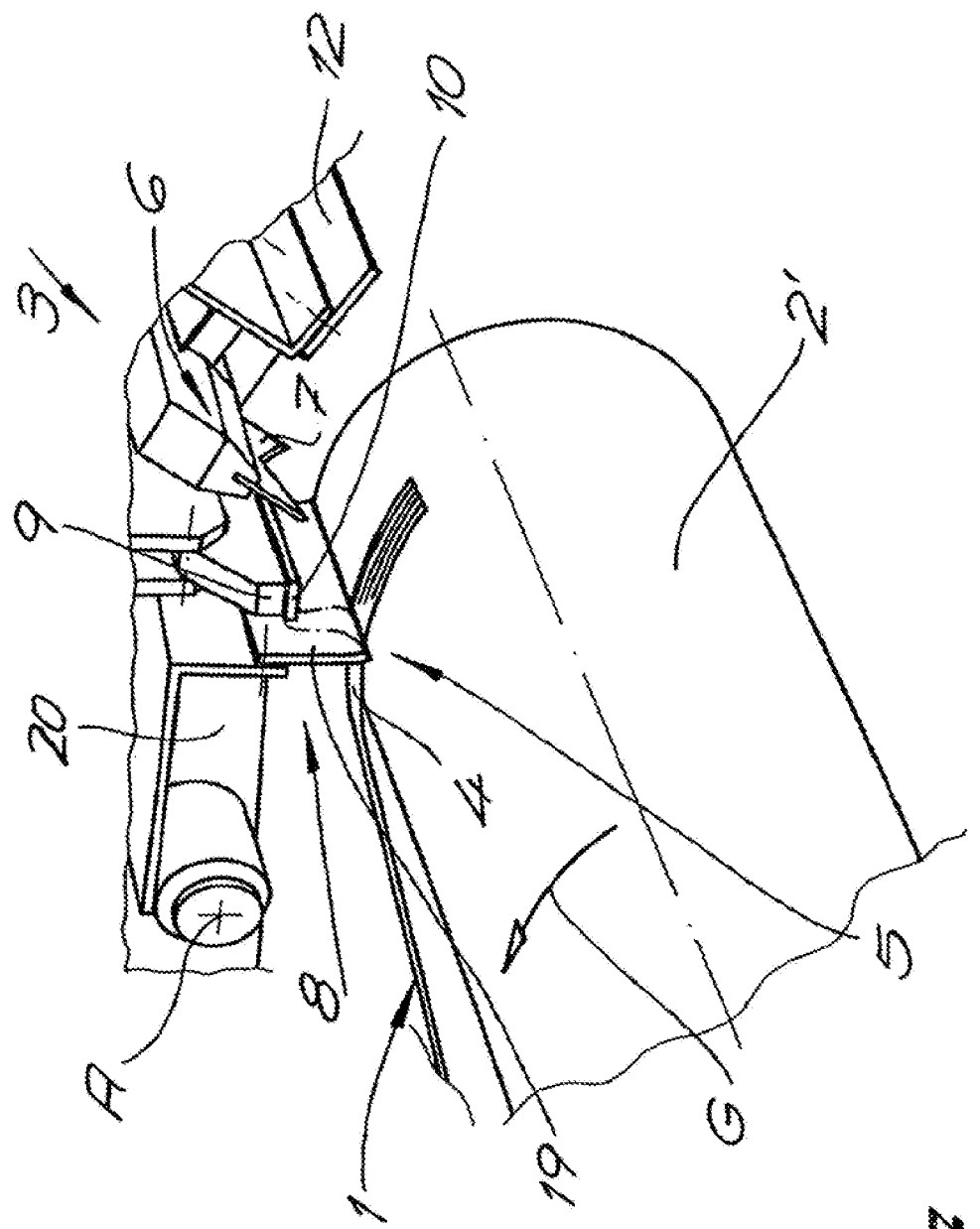
FIG. 7 shows the object according to FIG. 5 in a further functional position.

As an example, it is evident in FIGS. 3 and 4 that separating means 3 is provided with a cutter 6 for severing fiber strand 1. For this purpose, a cutting blade 7 that can be extended in the direction of arrow s is provided in cutter 6. The separating means is also provided with a clamp 8 having clamping jaws 9, 10 that can be moved together or apart from one another. At the end of the operation of winding on first former 2, clamping jaws 9, 10 are moved together to trap fiber strand 1 or fiber-strand end 4, so that fiber strand 1 or fiber-strand end 4 is clamped or fixed between the clamping jaws 19, 10. This functional condition is illustrated in FIGS. 5 and 7. After fiber strand 1 has been clamped between clamping jaws 9, 10, fiber strand 1 is severed by means of cutting blade 7 (FIG. 5). Because former 2 continues to rotate in the direction of arrow R, trailing end 11 of fiber strand 1 is squeezed or pressed against finish-wound former 2 by a first squeegee designed as elastic lip 12. In the practical example, the first squeegee designed as elastic lip 12 is mounted on separating means 3 and is disposed directly or closely above former 2.

Figure 6:
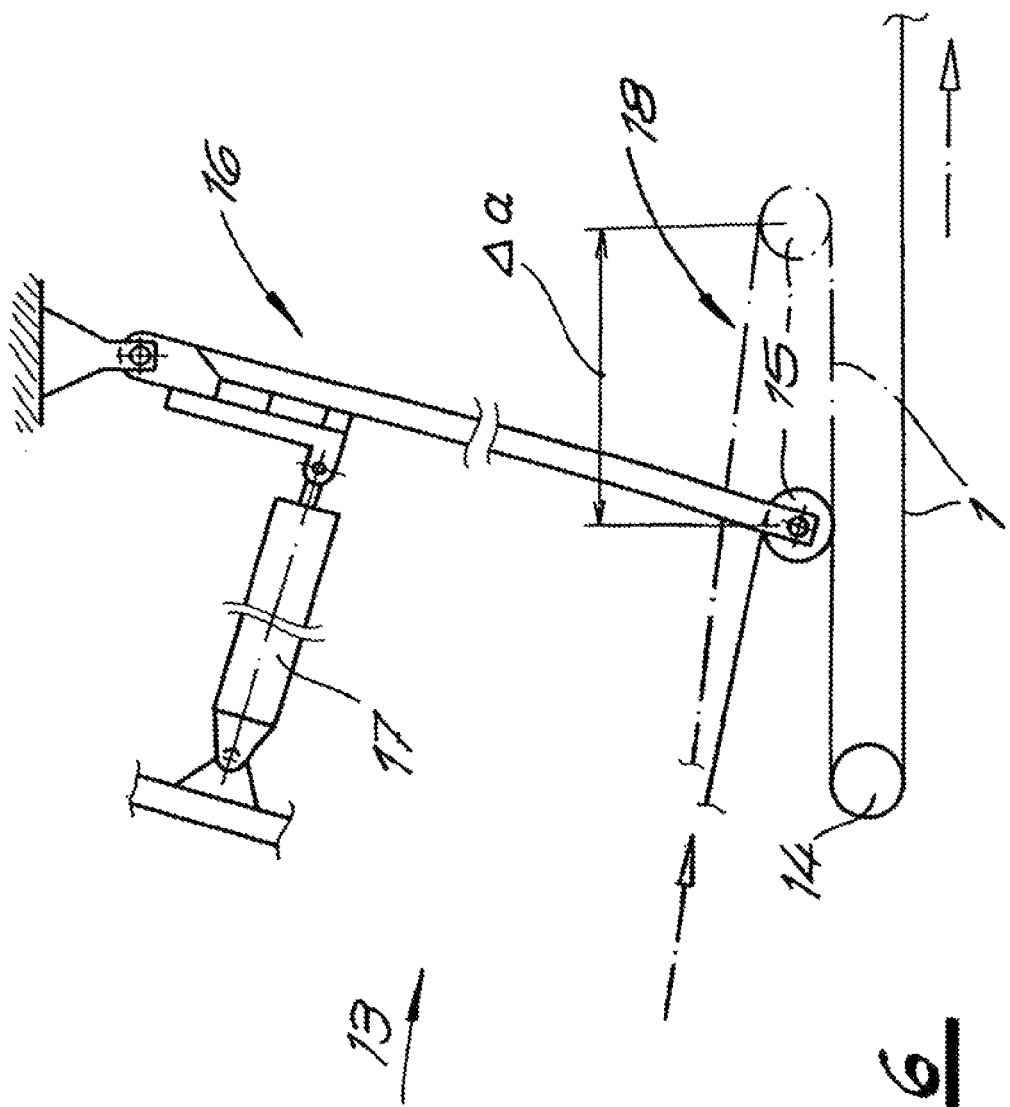
FIG. 6 shows a side view of an inventive thread buffer.

Continuous further delivery of fiber strand 1 to former 2 does not take place, of course, as long as fiber-strand end 4 is fixed by clamp 8. Nevertheless, fiber strand 1 is still fed continuously to thread buffer 13. This thread buffer 13 is expediently disposed downstream from the unillustrated impregnater and upstream from former 2 or separating means 3. Thread buffer 13 is illustrated in more detail in FIG. 6. Here the direction of delivery of fiber strand 1 has been indicated by dashed arrows. Thread buffer 13 is provided first with a first guide roll 14 and with a second guide roll 15, over which guide rolls 14, 15 there is passed fiber strand 1. Second guide roll 15 is connected to a lever 16 that can be acted on by a cylinder 17. Second guide roll 15 can be displaced relative to first guide roll 14 by the action of cylinder 17 on lever 16, so that the distance between first guide roll 14 and second guide roll 15 grows by a distance increment Δa. When fiber strand 1 or fiber-strand end 4 is now fixed or clamped by clamp 8, fiber strand 1 can nevertheless be fed continuously to thread buffer 13, as before, provided second guide roll 15 is then displaced by distance increment Δa. In this way, a fiber-strand portion 18 proportional to distance increment Δa can be temporarily stored in thread buffer 13. In other words, fiber strand 1 can be fed continuously to thread buffer 13, even though fiber-strand end 4 is clamped or fixed by clamp 8.

FIG. 7 illustrates the functional condition in which former 2, which has already been finish-wound, has been removed and a second former 2' to be newly wound has already been introduced into winding region 5. Furthermore, separating means 3 has in this case been brought up to former 2' in such a way that fiber-strand end 4 is in contact with second former 2'. Following the functional position illustrated in FIG. 7, clamping jaws 9, 10 of clamp 8 open, so that fiber-strand end 4 is released, as it were, from clamp 8. Thereafter, second former 2' rotates in the direction of arrow G, opposite to the direction of winding. Thereby the fiber-strand end is squeezed or pressed against former 2' by the second squeegee designed as elastic lip 19. The second squeegee designed as elastic lip 19 is also a part of separating means 3. Here elastic lip 19 is mounted on a swivel arm 20, which is provided at its end with second or lower clamping jaw 10. Swivel arm 20 is illustrated in particular in FIGS. 3 and 4, and can be pivoted around shaft A or pivoted toward upper clamping jaw 9.

Once fiber-strand end 4 has been squeezed against new former 2' as described in the foregoing, the starting turns are then applied, and for this purpose former 2' is once again rotated in winding direction. The starting turns of fiber-strand portion 18 stored temporarily in thread buffer 13 are now applied on second former 2' under a first smaller thread tension. For this purpose, second guide roll 15 of thread buffer 13 is retracted by means of lever device 16 and cylinder arrangement 17 back to its starting position (indicated by the solid outline in FIG. 6). In the course of this application of the starting turns with smaller thread tension, former 2' executes, for example, one half revolution to as many as two revolutions. Thereafter winding of fiber strand 1 takes place once again, and does so under a second thread tension, which is greater than that of the operation of application of the starting turns. Separating means 3 can then be pivoted back out to the position illustrated in FIG. 1. At the end of the operation of winding onto second former 2', separating means 3 is then again pivoted into winding region 5 (FIG. 2), and then the sequence of steps of the method described in the foregoing begins all over again.

European Application EP 04005399.3 (EP 1,570,973) filed on Mar. 6, 2004, is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

The invention claimed is:

1. An apparatus for winding a fiber strand onto formers, the apparatus comprising:
   means in a winding station for holding a first former and rotating it about an axis;
   supply means for continuously feeding the fiber strand in a feed direction to the first former rotating about the axis such that the fiber strand is wound up on the first former;
   a support pivotal between a use position closely juxtaposed with the strand and adjacent the former and a rest position spaced from the strand and from the former;
   a blade on the support, the blade being aligned and engageable with the strand in the use position;
   a clamp on the support and having a pair of jaws flanking the strand upstream of the blade in the use position;
   a first squeegee on the support downstream of the clamp;
   a second squeegee on the support upstream of the clamp, pivoting of the support from the rest position into the use position advancing the blade to cut the strand whereupon advance of at least one of the jaws grips the strand upstream of the blade and further pivoting of the support into the use position thereafter presses a trailing end of the strand wound on the first former against the first former with the first squeegee and after replacement of the first former with a fresh former presses a leading end of the cut strand gripped by the jaws with the second squeegee against the fresh former in the winding station, and subsequent disengagement of the jaws from the strand and pivoting of the support back into the rest position winds the strand up on the fresh former; and
   a buffer engaging the strand between the supply means and the axis and having at least two spaced guide rolls for the fiber stand for taking up slack in the strand during cutting and clamping of the strand, a spacing between the guide rolls being adjustable to vary how much of the strand is taken up between the rolls.

2. The apparatus according to claim 1, further comprising:
   at least one impregnating device for impregnating the fiber strand with a resin, the impregnating device being upstream from the buffer in the feed direction.

\* \* \* \* \*